(12) United States Patent
Minami et al.

(10) Patent No.: US 9,884,518 B2
(45) Date of Patent: Feb. 6, 2018

(54) PNEUMATIC TIRE

(71) Applicant: The Yokohama Rubber Co., LTD., Minato-ku, Tokyo (JP)

(72) Inventors: Yuji Minami, Hiratsuka (JP); Masataka Kubota, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 14/770,434

(22) PCT Filed: Feb. 25, 2013

(86) PCT No.: PCT/JP2013/054766
§ 371 (c)(1),
(2) Date: Aug. 25, 2015

(87) PCT Pub. No.: WO2014/128966
PCT Pub. Date: Aug. 28, 2014

(65) Prior Publication Data
US 2016/0001604 A1    Jan. 7, 2016

(51) Int. Cl.
*B60C 3/04*    (2006.01)
*B60C 11/03*    (2006.01)
(Continued)

(52) U.S. Cl.
CPC ............ *B60C 11/0304* (2013.01); *B60C 3/04* (2013.01); *B60C 5/00* (2013.01); *B60C 11/033* (2013.01);
(Continued)

(58) Field of Classification Search
CPC ...... B60C 11/033; B60C 3/04; B60C 11/0304
See application file for complete search history.

(56) References Cited

U.S. PATENT DOCUMENTS 4,635,694 A * 1/1987 Hosokawa .......... B60C 11/0306
152/209.9
4,905,748 A    3/1990 Kukimoto et al.
(Continued)

FOREIGN PATENT DOCUMENTS

CN    102774244    11/2012
DE    3720788 A1 * 1/1988
(Continued)

OTHER PUBLICATIONS

Machine translation for Japan 62-103205 (no date).*
(Continued)

*Primary Examiner* — Steven D Maki
(74) *Attorney, Agent, or Firm* — Thorpe North & Western

(57) ABSTRACT

The present technology pertains to a pneumatic tire having an asymmetrical pattern, which is formed by grooves, formed on a tread portion. A ratio SW/OD between the total width SW and the outer diameter OD of the pneumatic tire satisfies SW/OD≤0.3. A groove area ratio in a ground contact region G in the tread portion is GR, and a range from a tire equator line CL to the vehicle side in the ground contact region is a tire inside region Ai and the groove area ratio in the tire inside region Ai is GRi, and a range from the tire equator line CL to the opposite side of the vehicle side in the ground contact region is a tire outside region Ao and the groove area ratio in the tire outside region Ao is GRo, the ground contact region satisfies 10%≤GR≤25%, GRo.

12 Claims, 4 Drawing Sheets

(51) Int. Cl.
*B60C 5/00* (2006.01)
*B60C 11/04* (2006.01)

(52) U.S. Cl.
CPC ...... *B60C 11/0306* (2013.01); *B60C 11/0332* (2013.01); *B60C 11/04* (2013.01)

(56) References Cited

U.S. PATENT DOCUMENTS

| | | | | |
|---|---|---|---|---|
| 5,309,963 | A * | 5/1994 | Kakumu | B60C 11/0318 152/209.18 |
| 5,358,021 | A * | 10/1994 | Takasugi | B60C 11/0318 152/209.28 |
| 5,622,575 | A * | 4/1997 | Meyer-Adlung | B60C 11/00 152/209.16 |
| 6,568,444 | B1 * | 5/2003 | Kaneko | B60C 3/04 152/209.18 |
| 2002/0033212 | A1 * | 3/2002 | Caretta | B60C 11/18 152/209.5 |
| 2005/0016656 | A1 * | 1/2005 | Kuroki | B60C 11/00 152/548 |
| 2007/0151646 | A1 * | 7/2007 | Ito | B60C 11/0306 152/209.25 |
| 2011/0094639 | A1 * | 4/2011 | Daisho | B60C 11/00 152/209.5 |
| 2011/0146864 | A1 * | 6/2011 | Stuckey | B60C 11/0306 152/209.18 |
| 2012/0285592 | A1 * | 11/2012 | Kameda | B60C 11/1392 152/209.8 |
| 2013/0042953 | A1 | 2/2013 | Kuwayama | |
| 2013/0048173 | A1 * | 2/2013 | Kiwaki | B60C 11/0309 152/209.18 |
| 2014/0158263 | A1 * | 6/2014 | Hatanaka | B60C 3/04 152/209.18 |

FOREIGN PATENT DOCUMENTS

| | | | |
|---|---|---|---|
| EP | 370699 | A2 * | 5/1990 |
| GB | 2401588 | A * | 11/2004 |
| JP | 62-103205 | A * | 5/1987 |
| JP | 63-159108 | A * | 7/1998 |
| JP | 2002-225511 | A * | 8/2002 |
| JP | 2009-126250 | | 6/2009 |
| JP | 2009-143450 | | 7/2009 |
| JP | 2011-230699 | | 11/2011 |
| JP | 2013-028289 | | 2/2013 |
| WO | WO-2011/122170 | A1 * | 10/2011 |
| WO | WO 2011/135774 | | 11/2011 |
| WO | WO-2013/014950 | A1 * | 1/2013 |

OTHER PUBLICATIONS

Machine translation for Japan 63-159108 (no date).*
Machine translation for Japan 2002-225511 (no date).*
Machine translation for German 3,720,788 (no date).*
International Search Report for International Application No. PCT/JP2013/054766 dated Apr. 9, 2013, 4 pages, Japan.

* cited by examiner

PNEUMATIC TIRE

TECHNICAL FIELD

The present technology pertains to a pneumatic tire whereby fuel economy performance for a passenger vehicle is improved.

BACKGROUND ART

Conventionally, pneumatic tires that reduce rolling resistance have been proposed, in particular, in order to offer low fuel consumption for vehicles such as hybrid vehicles (HV), electric vehicles (EV), and the like. Furthermore, in recent years, as concern for the environment has grown, pneumatic tires offering a higher degree of fuel economy for such vehicles have been sought.

A method of reducing the rolling resistance of pneumatic tires is known in which air resistance in the vicinity of the tire is reduced by narrowing a total width (SW) of the pneumatic tire and making a forward projection surface area smaller (for example, see International Patent Publication No. WO2011/135774).

However, the above-described method also narrows the ground contact width as the total width of the pneumatic tire is narrowed. As such, the outer diameter (OD) must be increased in order to maintain a fixed load capacity. As a result, the ground contact length of the pneumatic tire becomes comparatively long.

Lengthening the ground contact length of the pneumatic tire greatly improves the drainage (WET performance). Conversely, narrowing the ground contact width poses a risk of decreasing the cornering force (CF), which may lead to a decrease in steering stability.

SUMMARY

The present technology provides a pneumatic tire that decreases the rolling resistance while enabling improvements to the steering stability worsened by doing so.

In order to resolve the above described problems, according to the present technology, a pneumatic tire has an asymmetrical pattern formed by grooves on a tread portion, the ratio of a total width SW and an outer diameter OD of the pneumatic tire SW/OD satisfies:

$SW/OD \leq 0.3$ and when a groove area ratio of a ground contact region of the tread portion is GR, and while mounted on a vehicle, when a range of the ground contact region positioned on a vehicle side relative to a tire equatorial line is a tire inside region Ai and a groove area ratio in the tire inside region Ai is GRi, and while mounted on the vehicle, when a range of the ground contact region positioned on a side opposite to the vehicle side relative to the tire equatorial line is a tire outside region Ao and a groove area ratio in the tire outside region Ao is GRo, the ground contact region is formed to satisfy:

$10\% \leq GR \leq 25\%$;

$GRo < GRi$; and $0.1 \leq (GRi - GRo)/GR \leq 0.6$.

According to the pneumatic tire of the present technology, the rolling resistance is decreased while enabling improvements to the steering stability worsened by doing so.

The following provides a sufficient level of understanding of the present technology, in terms of the accompanying drawings and a preferred embodiment of the present technology.

DETAILED DESCRIPTION (Embodiment)

Figure 1:
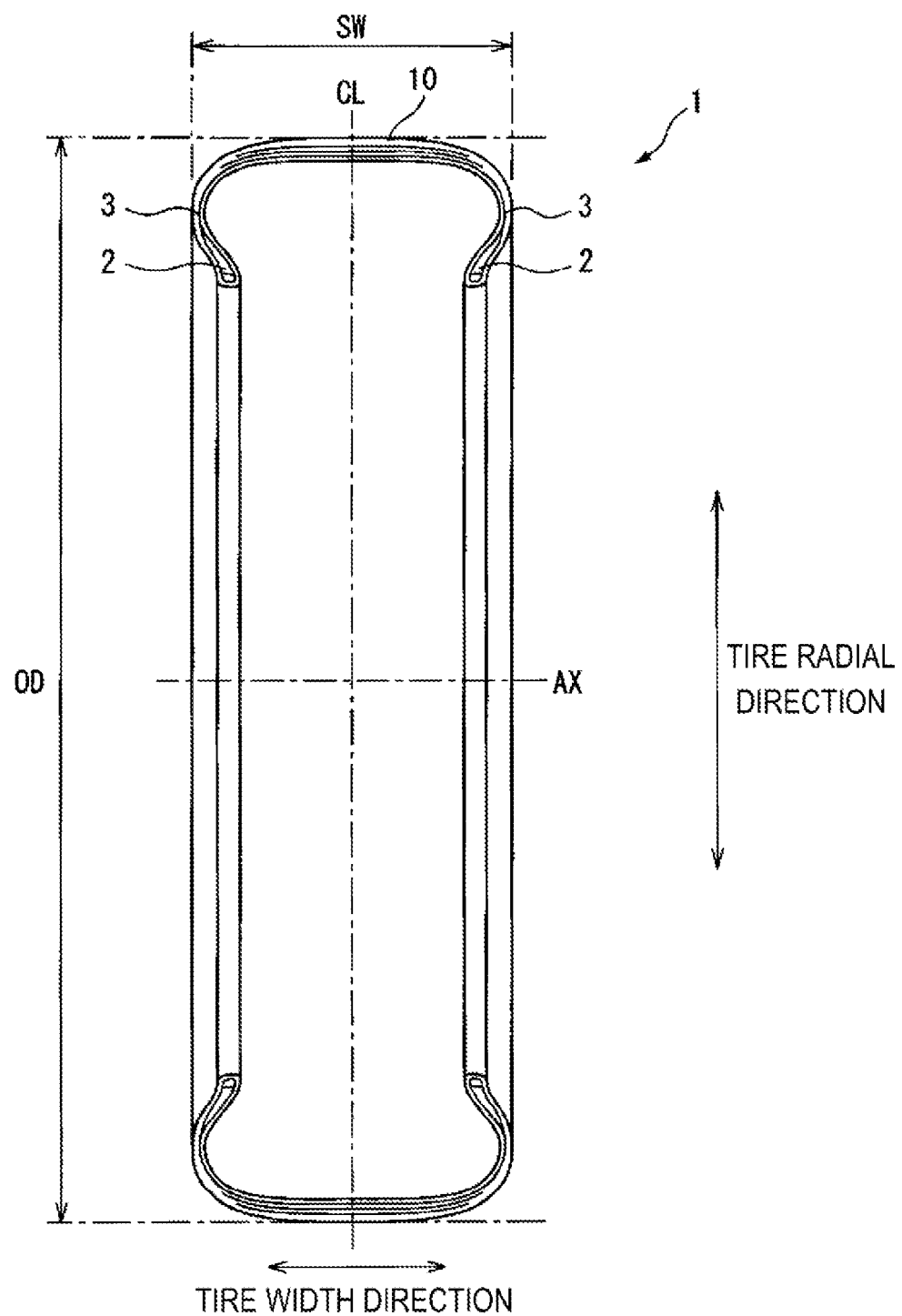
FIG. 1 is a meridional cross-sectional view of a pneumatic tire pertaining to an embodiment of the present technology.

A pneumatic tire 1 pertaining to an embodiment of the present technology is described below, with reference to the accompanying drawings. FIG. 1 is a meridional cross-sectional view of the pneumatic tire 1 of an embodiment of the present technology. The pneumatic tire 1 of the present embodiment has a meridional cross-sectional shape similar to that of a conventional pneumatic tire. Here, the meridional cross-sectional shape of the pneumatic tire refers to the cross-sectional shape of the pneumatic tire as seen in a plane perpendicular to a tire equatorial plane CL.

In the following description, the term tire radial direction refers to a direction orthogonal to a rotational axis AX of the pneumatic tire 6. Also, the term tire circumferential direction refers to a direction of rotation about the rotational axis AX (see FIG. 2). In addition, the term tire width direction refers to a direction parallel to the rotational axis AX. The tire equatorial plane CL is a plane that is orthogonal to the rotational axis AX of the pneumatic tire 1 and passes through the center of the width of the pneumatic tire 1. A tire equatorial line is a line along the tire circumferential direction of the pneumatic tire 1 that lies on the tire equatorial plane CL. In the present specification and drawings, the tire equatorial line is labeled CL, identically to the tire equatorial plane.

The pneumatic tire 1 of the present embodiment includes, as seen in a tire meridional cross-section, a pair of bead portions 2, a sidewall portion 3 connected to each of the bead portions, and a tread portion 10 linking the sidewall portions to each other.

Here, in the present technology, no particular limitation to the internal structure of the pneumatic tire is intended. The internal structure of the pneumatic tire is expected to vary according to performance, design, and the like requested for the pneumatic tire, and, for instance, is preferably determined so as to satisfy various requirements through experimentation, simulation, and the like.

In the pneumatic tire 1 of the present embodiment, a ratio of a total width SW to an outer diameter OD is:

$SW/OD \leq 0.3$ <1>.

The tire is formed so as to satisfy this relationship.

Here, in the present technology, the total width SW is the spacing between the sidewalls, including any designs on the sidewalls, measured when the pneumatic tire 1 is assembled on a rim, filled to an internal pressure of 230 kPa (internal pressure set as desired) in order to define the dimensions of the pneumatic tire 1, and in an unloaded state. Also, the outer diameter OD is the outer diameter of the tire under the above circumstances. Here, the internal pressure of 230 kPa as described above has been selected in order to define the dimensions of the pneumatic tire. As a result, the pneumatic tire 1 pertaining to the present technology produces the effects of the present technology provided that the pneumatic tire 1 is filled to an internal pressure within a commonly used range. It is to be noted that filling to an internal pressure of 230 kPa is not necessary to the implementation of the present technology.

Here, the rim used in the present technology has a rim diameter suited to the internal diameter of the pneumatic tire 1, and, in conformity with ISO 4000-1:2001, has a nominal rim width corresponding to the specified rim width Rm (mm) in Table 2 closest to the product of Rm=K1×Sn, where Sn is the nominal tire cross-sectional width and K1 is a coefficient determined by the aspect ratio of the tire assembled on the rim according to the correspondence table given in Table 1.

TABLE 1

| Aspect Ratio | K1 |
| --- | --- |
| 20-25 | 0.92 |
| 30-40 | 0.90 |
| 45 | 0.85 |
| 50-55 | 0.80 |
| 60-70 | 0.75 |
| 75-95 | 0.70 |

TABLE 2

| Nominal Rim Width | Rm (mm) |
| --- | --- |
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

Figure 2:
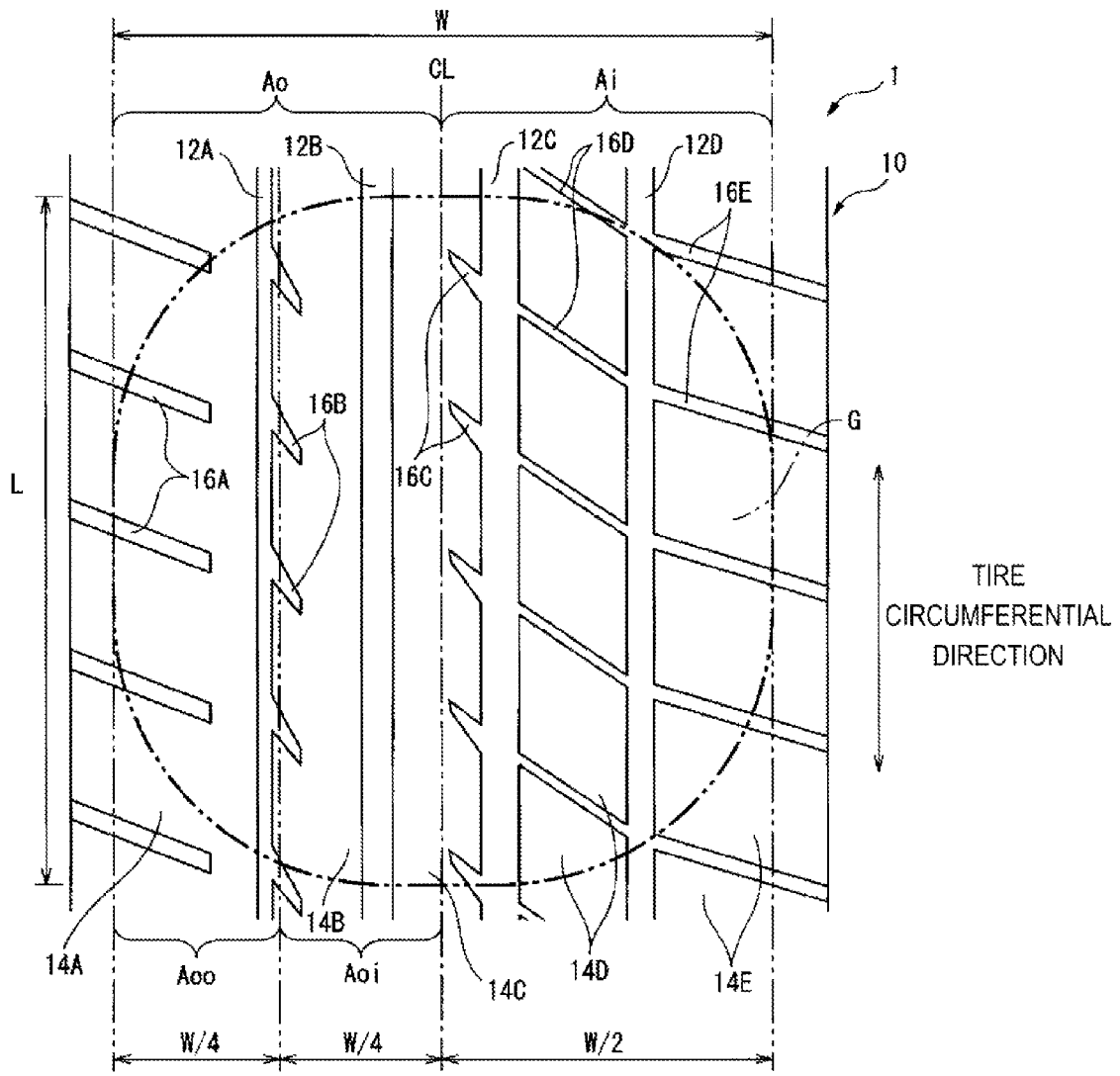
FIG. 2 is a planar development diagram illustrating a portion of a tread portion of a pneumatic tire pertaining to an embodiment of the present technology.

FIG. 2 is a planar development diagram illustrating a portion of the tread portion 10 of the pneumatic tire 1 pertaining to an embodiment of the present technology. FIG. 2 illustrates that the right-hand side relative to the tire equatorial line CL is a vehicle side when a tire is mounted on the vehicle, and the left-hand side relative to the tire equatorial line CL is a side opposite the vehicle side when a tire is mounted on the vehicle. That is, in the present description and the drawings, the pneumatic tire 1 is described as being mounted on the left-hand side of the vehicle.

The tread portion 10 of the pneumatic tire 1 of the present embodiment has four circumferential grooves 12A, 12B, 12C, 12D each extending in the tire circumferential direction, and land portions 14A, 14B, 14C, 14D, 14E formed by being partitioned by the circumferential grooves 12A, 12B, 12C, 12D. Each of the land portions 14A, 14B, 14C, 14D, 14E has grooves 16 other than the circumferential grooves 12A, 12B, 12C, 12D, disposed on the tread portion 10, namely a plurality of lateral grooves 16A, 16B, 16C, 16D, 16E extending in a direction intersecting the tire circumferential direction. Here, in the present description, the circumferential grooves 12 and the lateral grooves 16 are collectively designated grooves 12, 16. In the present technology, the lateral grooves 16 each have a groove width of from 1.5 mm to 8 mm. As indicated in FIG. 2, the configuration of the grooves 12, 16 and the land portions 14 form an asymmetrical pattern on the tread portion 10.

In a ground contact region G of the tread portion 10 on the pneumatic tire 1 of the present embodiment, a groove area ratio GR relative to the ground contact area, a groove area ratio GRi of a tire inside region Ai, and a groove area ratio GRo of a tire outside region Ao are each formed so as to satisfy the following relationships:

$$10\% \le GR \le 25\% \qquad <2>$$

$$GRo < GRi \qquad <3>$$

$$0.1 \le (GRi - GRo)/GR \le 0.6 \qquad <4>.$$

In the present technology, the ground contact region G is a region in contact with the ground once the pneumatic tire 1 undergoes rim assembly on a rim as described above, is filled to an internal pressure of 230 kPa, and is loaded to the equivalent of 80% of load capacity while in contact with flat ground. A ground contact width W is the maximum width of the ground contact region in the tire width direction. A ground contact length L is the maximum length of the ground contact region in the tire circumferential direction. In addition, in the present technology, the load capacity is a load capacity defined in accordance with ISO 4000-1:1994. However, for a size not having a load capacity index designated in the ISO standard, a description is given for determining the load capacity in consideration of consistency with standards of foreign countries as individually calculated. In such a situation, the load capacity is calculated according to the standards of the relevant country. As a result, the present technology is, in actuality, described by the load capacity calculations given in JIS D4202-1994, using load capacity calculation formulae employed by the JIS standards. The below-given calculation formula (c) serves to calculate the load capacity for each tire size.

$$X = K \times 2.735 \times 10 - 5 \times P^{0.585} \times Sd^{1.39} \times (D_R - 12.7 + Sd)$$

where X=load capacity (in kg)
K=1.36
P=230(=air pressure (in kPa))
$Sd = 0.93 \times S_{0.75} - 0.637d$
$S_{0.75} = S \times ((180° - \text{Sin}^{-1}((Rm/S))/131.4°)$
S=Design cross-sectional width (in mm)
$R_m$=Rim width (in mm) corresponding to design cross-sectional width
d=(0.9−Aspect ratio (no unit)×$S_{0.75}$−6.35
$D_R$=Standard value of rim diameter (in mm)

Then, the groove area ratio GR is the ratio of groove area to the sum of land portion surface area and the groove area in the ground contact region G (=ground contact area).

Furthermore, as illustrated in FIG. 2, upon mounting the tire on the vehicle, the tire inside region Ai is a range positioned on the vehicle side, with respect to the tire equatorial line CL, of the ground contact region G and having a width of half the ground contact width W. Likewise, upon mounting the tire on the vehicle, the tire outside region Ao is a range positioned on the opposite side of the vehicle side, with respect to the tire equatorial line CL, of the ground contact region G and having a width of half the ground contact width W. Then, the groove area ratio GRi in the tire inside region Ai is the ratio of the groove area to the sum of the land portion surface area and the groove area in the tire inside region Ai. Likewise, the groove area ratio GRo in the tire outside region Ao is the ratio of the groove area to the sum of the land portion surface area and the groove area in the tire outside region Ao.

The pneumatic tire 1 pertaining to the present embodiment produces the following effects.

(1) The pneumatic tire 1 pertaining to the present embodiment is formed such that the ratio of the total width SW to the outer diameter OD satisfies the relationship of Formula <1>, given above. Accordingly, in comparison to a pneumatic tire of a typical size (for example, 205/55R16 (where SW/OD=0.32)), the total width SW is narrower relative to the outer diameter OD. As a result, a forward projection surface area of the pneumatic tire 1 is made smaller, air resistance in the vicinity of the tire is reduced, and this leads to rolling resistance of the pneumatic tire 1 being reduced. Conversely, simply narrowing the total width SW decreases the load capacity of the pneumatic tire 1. However, the outer diameter OD is made relatively larger with respect to the total width SW by satisfying Formula <1>. As such, the decrease in load capacity may be constrained.

(2) The pneumatic tire 1 pertaining to the present embodiment is formed such that a groove area ratio GR with respect to the ground contact area takes on a value within a range indicated by Formula <2>, described above. The range of the groove area ratio GR is set low in comparison to a typical pneumatic tire. Accordingly, the rigidity of the tread portion 10 is increased by expanding the surface area where the land portion 14 contacts the ground. This enables the steering stability to be improved. Here, having the groove area ratio GR be greater than 25% decreases the rigidity of the tread portion 10. This poses a difficulty in improving the steering stability in that sufficient cornering force is unobtainable. Then, narrowing the total width SW as described above improves the drainage. However, decreasing the groove area ratio GR below 10% reduces the grooves 12, 16 provided in the tread portion 10. This poses a difficulty in maintaining the overall drainage in that sufficient draining is unobtainable in the ground contact region G.

(3) The pneumatic tire 1 pertaining to the present embodiment is formed such that the groove area ratio GR in the ground contact region G, a groove area ratio GRo in the tire outside region Ao, and a groove area ratio GRi in the tire inside region Ai satisfy the relationships of Formulae <3> and <4>, given above. As such, fewer grooves are provided in the tire outside region Ao relative to the tire inside region Ai. As a result, the pneumatic tire 1 pertaining to the present embodiment has a comparatively low groove area ratio GR, as explained in point (2). The resulting decrease in the drainage can be constrained by having the groove area ratio GRi of the tire inside region Ai be greater than the groove area ratio GRo of the tire outside region Ao. Furthermore, given that the surface area of the land portion 14 positioned in the tire outside region Ao that contacts the ground is larger in comparison to the tire inside region Ai, the rigidity of the tread portion 10 is high in the tire outside region Ao. As a result, sufficient cornering force may be obtained, which leads to enabling improvements to the steering stability. Here, in relation to Formula <4>, on one hand, having the value of (GRi−GRo)/GR be smaller than 0.1 makes the worsening of the drainage insufficiently constrainable. On the other hand, having the value of (GRi−GRo)/GR be greater than 0.6 decreases the block rigidity of the tread portion 10 in the tire inside region Ai. This may elicit a decrease in the steering stability.

(4) As described in point (1), the pneumatic tire 1 pertaining to the present embodiment has a relatively large outer diameter OD and a relatively narrow total width SW in comparison to a pneumatic tire having a typical size. Accordingly, improvements to vehicle compactness and to design can be expected.

In addition, the groove area ratios GR, GRi, and GRo are preferably set such that the relationships $$15\% \leq GR \leq 22\%, \text{ and/or}$$

$$0.2 \leq (GRi-GRo)/GR \leq 0.4$$

are satisfied. Furthermore, doing so enables, at a higher degree, the worsening of the drainage to be constrained while increasing the rigidity of the tread portion 10 in the tire outside region Ao. As a result, steering stability can be improved.

Here, a plurality of lateral grooves 16 are disposed on the tread portion 10, as illustrated in FIG. 2. In terms of a groove area ratio GRL of the lateral grooves 16 (a ratio of the groove area of the lateral grooves 16 to the sum of the land portion surface area and the groove area within the ground contact region G (=ground contact area)), the groove area ratio GRLo of the lateral grooves 16 in the tire outside region Ao and the groove area ratio GRLi of the lateral grooves 16 in the tire inside region Ai are preferably set such that the relationship:

$$1.1 \leq GRLi/GRLo \leq 1.9 \qquad <5>$$

is satisfied. This is because doing so enables constraint of the worsening of the drainage and improvement to the steering stability through the increase in block rigidity and ground contact area to both be achieved to a high degree. Here, on one hand, having the value of GRLi/GRLo be less than 1.1 does not sufficiently provide the effect of constraining the worsening of the drainage. On the other hand, having the value of GRLi/GRLo be greater than 1.9 produces a remarkable decrease in block rigidity for the tread portion 10 in the tire inside region Ai, and poses a risk of decreasing the steering stability.

In addition, in an entire circumference of the tread portion 10 of the pneumatic tire 1 of the present embodiment, among the lateral grooves 16 arranged with spacing in the circumferential direction, a number of the lateral grooves 16A, 16B arranged in the tire outside region Ao is designated Po, and a number of the lateral grooves 16C, 16D, 16E arranged in the tire inside region Ai is designated Pi. The following relationship:

$$1 < Pi/Po \leq 2 \qquad <6>$$

is preferably satisfied. Given that the lateral grooves 16 are disposed in greater numbers in the tire inside region Ai than the tire outside region Ao, improvements to the drainage are expected. Furthermore, this is because doing so enables constraint of the worsening of the drainage and improvement to the steering stability through the increase in block rigidity and ground contact area to both be achieved to a high degree.

Further, for the same reasoning as that of Formula <6>, the number of the lateral grooves 16C, 16D, 16E positioned in the tire inside region Ai is preferably from 40 to 80. Here, the number of the lateral grooves 16C, 16D, 16E is a total number for the entire tire circumference, applicable to any of the lateral grooves 16C, the lateral grooves 16D, and the lateral grooves 16E having the widest spacing between respective lateral grooves 16C, 16D, 16E arranged in the tire circumferential direction and neighboring each other.

Furthermore, with reference to FIG. 2, within the tread portion 10, as described above, the circumferential grooves 12C, 12D are provided in the tire inside region Ai (corresponding to inside circumferential grooves), and the circumferential grooves 12A, 12B are provided in the tire outside region Ao (corresponding to outside circumferential grooves). Here, the relationship between the groove area ratio GRBi of the circumferential grooves 12C, 12D positioned in the tire inside region Ai and the groove area ratio GRBoi of the circumferential grooves 12A, 12B positioned in the tire outside region Ao is such that $$1 \leq GRBi/GRBoi \leq 2 \qquad <7>$$

is satisfied. Enlarging the groove area ratio GRBi of the circumferential grooves 12C, 12D positioned in the tire inside region Ai enables the worsening of the drainage to be further constrained.

As described above, the tread portion 10 of the pneumatic tire 1 of the present embodiment is provided with both the circumferential grooves 12 and the lateral grooves 16. However, in the present technology, the tread portion 10 of the pneumatic tire 1 is provided with the grooves 12, 16. The ground contact region G of this pneumatic tire 1 preferably satisfies at least formulae <2> to <4>. In other words, at least one of the circumferential grooves 12 and the lateral grooves 16 are preferably provided in the tread portion 10 of the pneumatic tire 1 of the present technology such that at least formulae <2> to <4> are satisfied.

(Modified Example)

Figure 3:
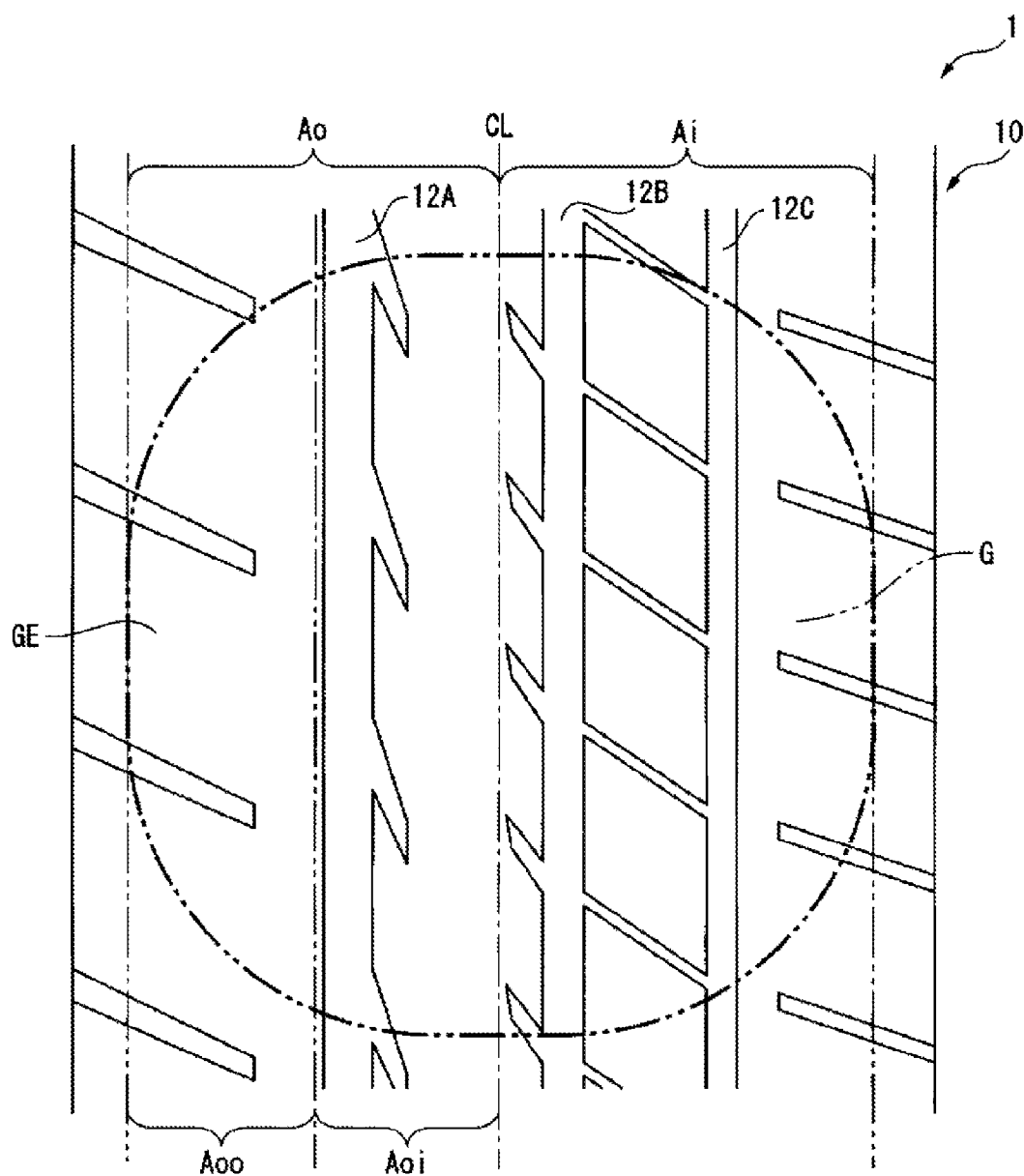
FIG. 3 is a planar development diagram illustrating a portion of a tread portion of a pneumatic tire pertaining to a modified example of an embodiment of the present technology.

FIG. 3 is a planar development diagram illustrating a portion of a tread portion of a pneumatic tire pertaining to a modified example of an embodiment of the present technology. Here, an inner tire outside region Aoi and an outer tire outside region Aoo are defined with reference to FIG. 3. The inner tire outside region Aoi is a range positioned on the tire equatorial line CL side of the tire outside region Ao, and has a width of 25% of the ground contact width W. Likewise, the outer tire outside region Aoo is a range positioned on a ground contact edge side in the tire width direction, excluding the inner tire outside region Aoi, of the tire outside region Ao, and has a width of 25% of the ground contact width W.

Here, as illustrated in FIG. 3, the circumferential groove 12A is provided in the inner tire outside region Aoi and extends in the tire circumferential direction. However, the circumferential grooves 12 are preferably not provided in the outer tire outside region Aoo. In the tire outside region Ao, a distance in the tire width direction is secured from a ground contact width edge GE to the circumferential groove 12A. This is done because doing so enables rigidity of the tread portion 10 to be increased in the tire width direction, and leads to improvements in steering stability during cornering.

EXAMPLES

In the present embodiment, tire performance testing was performed for pneumatic tires having various conditions, in terms of an RRC index, a fuel economy index, steering stability, and hydroplaning resistance performance (drainage).

This performance testing was performed by assembling each test tire on a rim of the above-described size, as suitable, and filling each of the test tires to an inner pressure of 230 kPa for actual vehicle testing.

The testing methods for the performance testing performed on the test tires are described next.

(RRC Index)

In conformity with ISO 28580, a drum testing machine having a drum diameter of 1707.6 mm was used, and rolling resistance was measured under conditions of air pressure of 210 kPa and speed of 80 km/h. The evaluation results were expressed using the inverse value as the measurement value against the conventional example having an index of 100. A smaller index value signifies lower rolling resistance.

(Fuel Economy) The test tires were mounted on a front wheel drive vehicle having a capacity of 1800 cc, driven for 50 laps at a speed of 100 km/h on a test course having a total length of 2 km, and a fuel economy improvement ratio was measured relative to a conventional fuel consumption ratio of 100. A greater index value represents better fuel economy.

(Steering Stability)

The test tires underwent rim assembly on a standard rim and were mounted on a passenger vehicle (having a capacity of 1800 cc), driven for 3 laps on a test course having a lap length of 2 km while performing lane changes, and had a feeling evaluation performed by three specialist drivers. The evaluation results are indicated as indices of average values of the evaluation score for each of the test tires, with the average value of the feeling evaluation for comparative example 1 being 100. Larger index values indicate superior steering stability.

(Hydroplaning Resistance Performance)

A linear hydroplaning test was performed, and the speed at which hydroplaning occurred was measured for evaluation. This linear hydroplaning test was performed by moving forward with increasing speed in a pool having a water depth of 10 mm. The slip rate of the pneumatic tire was measured at this time. The hydroplaning occurrence speed was taken to be the speed at which the slip rate reached 10%. For this testing, an index was calculated for the measured results of other examples, against the measured results of the conventional example having an index of 100. In the present embodiment, a larger index value indicates superior hydroplaning resistance performance.

The test tires and the performance testing results thereof are described next.

Conventional Example

Figure 4:
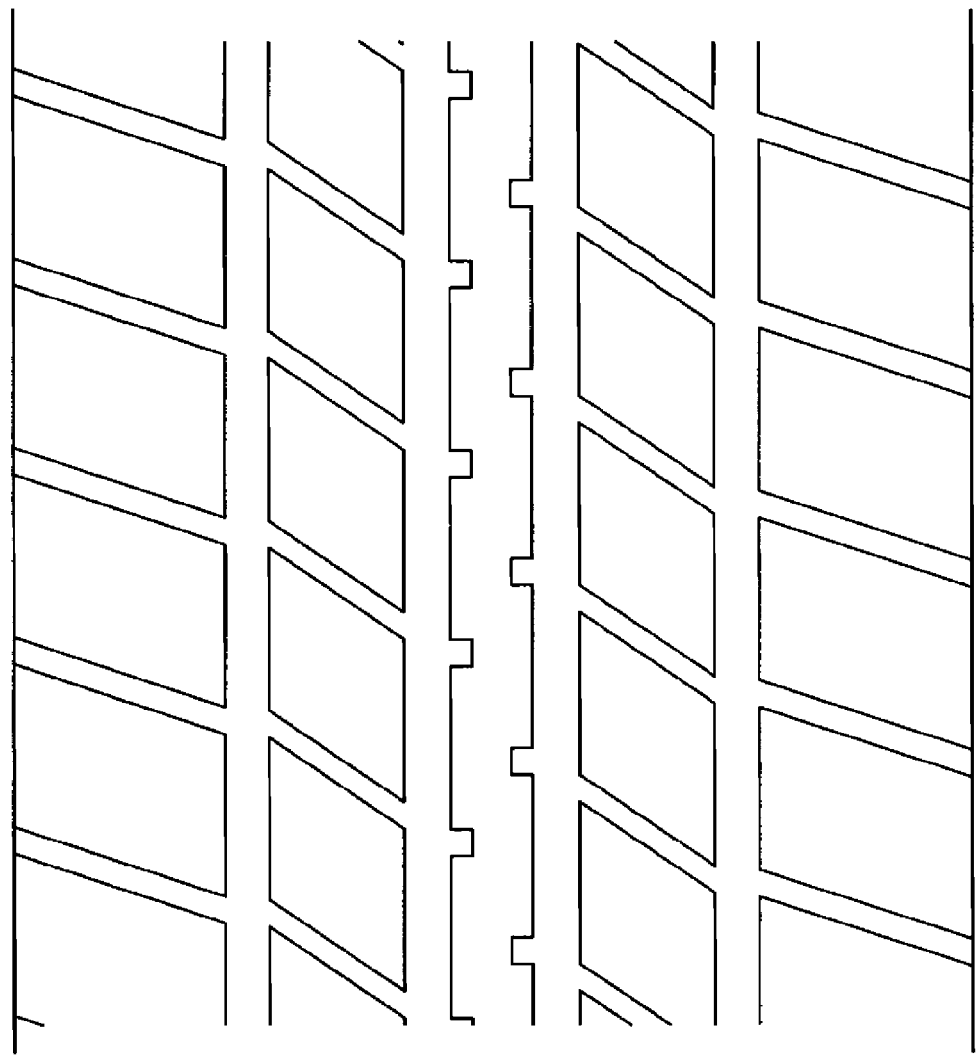
FIG. 4 is a planar development diagram illustrating a portion of a tread portion of a conventional pneumatic tire.

The pneumatic tires pertaining to the conventional example have a tire size of 205/55R16, and a value of 0.32 for SW/OD, that is, a value that does not satisfy Formula <1>. The tread portion of the pneumatic tire pertaining to the conventional example is provided with a tread pattern as illustrated in FIG. 4.

Working Examples 1 to 14

The pneumatic tires of the working examples 1 to 14 each have a different tire size, and a value of SW/OD in a range of 0.30 to 0.21, that is, a value that satisfies Formula <1>. The tread portion 10 of the pneumatic tire pertaining to each of the working examples 1 to 14 is provided with a tread pattern based on the tread pattern illustrated in FIG. 4, modified as appropriate to the respective tire size.

Performance testing pertaining to the RRC index and the fuel economy index was performed on the pneumatic tires pertaining to the conventional example and to the working examples 1 to 14. Table 3 lists numerical values and performance testing results pertaining to the dimensions of each of the test tires.

TABLE 3

|  | Conventional Example | Working Example 1 | Working Example 2 | Working Example 3 | Working Example 4 | Working Example 5 | Working Example 6 | Working Example 7 |
|---|---|---|---|---|---|---|---|---|
| Nominal Width | 205 | 185 | 195 | 175 | 185 | 155 | 165 | 175 |
| Aspect Ratio | 55 | 55 | 50 | 60 | 50 | 60 | 55 | 50 |
| Inner Diameter (inches) | 16 | 17 | 18 | 17 | 19 | 17 | 18 | 20 |
| Outer Diameter (mm) | 631.9 | 640.8 | 657.2 | 647.8 | 672.6 | 623.8 | 644.2 | 688 |
| SW/OD | 0.32 | 0.30 | 0.30 | 0.28 | 0.28 | 0.26 | 0.26 | 0.26 |
| RRC Index | 100 | 99 | 99 | 98 | 98 | 98 | 96 | 96 |
| Fuel Economy Index | 100.0 | 100.1 | 100.1 | 100.1 | 100.1 | 100.1 | 100.2 | 100.1 |

|  | Working Example 8 | Working Example 9 | Working Example 10 | Working Example 11 | Working Example 12 | Working Example 13 | Working Example 14 |
|---|---|---|---|---|---|---|---|
| Nominal Width | 145 | 155 | 165 | 145 | 155 | 145 | 145 |
| Aspect Ratio | 65 | 60 | 55 | 70 | 60 | 65 | 55 |
| Inner Diameter (inches) | 17 | 19 | 20 | 17 | 20 | 19 | 21 |
| Outer Diameter (mm) | 626.8 | 674.6 | 695 | 641.8 | 700 | 677.6 | 698.4 |
| SW/OD | 0.24 | 0.24 | 0.24 | 0.23 | 0.23 | 0.22 | 0.21 |
| RRC Index | 97 | 95 | 96 | 95 | 93 | 94 | 93 |
| Fuel Economy Index | 100.2 | 100.3 | 100.2 | 100.3 | 100.3 | 100.2 | 100.2 |

According to the performance testing results given in Table 3, the test tires pertaining to the working examples 1 to 14, which satisfy Formula <1>, each have a superior fuel economy index in comparison to the conventional example. According to these performance testing results, among tested tire sizes, a tire size of 165/55R20 (working example 11) has been confirmed as providing sufficient improvement in fuel consumption in contrast to a tire size of 205/55R16. Accordingly, this tire size is used for subsequent testing pertaining to the tread pattern.

Working Examples 15 to 17, Comparative Examples 1 to 3

The pneumatic tires pertaining to each of the working examples 15 to 17 and the comparative examples 1 to 3 have a tire size of 165/55R20. The pneumatic tire pertaining to comparative example 1 is a test tire modified from a conventional tire only in terms of the tire size. Then, the pneumatic tires pertaining to each of the working examples 15 to 17 and the comparative examples 2 and 3 are test tires where (GRi−GRo)/GR has a value of 0.4, and in which the groove area ratio GR is distributed in a range of 8% to 30%. Here, the working examples 15 to 17 each satisfy the relationships of Formulae <1> to <4>. However, the comparative examples 1 to 3 do not satisfy the relationship of Formula <2>.

Comparative example 1 is a standard tire in terms of steering stability, as described above. That is, in the present technology, the steering stability is given in terms of a standard in which the steering stability has decreased due to the change to a large tire size with a narrow width for the rolling resistance. Then, the pneumatic tires pertaining to the working examples are each evaluated on the steering stability in terms of a degree of improvement relative to comparative example 1.

Here, the tread portion of the pneumatic tire pertaining to each of the working examples and the comparative examples is based on the tread pattern of the conventional example, that is, on the tread pattern illustrated in FIG. 4. A modified tread pattern is provided on each test tire with dimensional parameters being suited to the groove area ratio GR and the like set for the test tires. As one example, the tread portion of the pneumatic tire pertaining to working example 16 is provided with the tread pattern illustrated in FIG. 2. Similarly, the pneumatic tires pertaining to each of the working examples and the comparative examples have a tread pattern based on the tread pattern illustrated in FIG. 4, such as the tread pattern illustrated in FIG. 2. The tread pattern is made suitable to the dimensional parameters of each test tire by modifying the groove area of the circumferential grooves 12 and the lateral grooves 16, the quantity of the circumferential grooves 12, and the position of the circumferential grooves 12 in terms of the tire width position, and the like.

Performance testing was performed on the pneumatic tires pertaining to the conventional example, the comparative examples 1 to 3, and the working examples 15 to 17, relating to the fuel economy index, the steering stability, and the hydroplaning resistance performance (labeled Hydro Performance in Table 4, and likewise in Tables 5 to 9). Table 4 lists numerical values pertaining to the dimensions of each of the test tires, and performance testing results.

Performance testing was performed on the pneumatic tires pertaining to the conventional example, the comparative examples 1 and 4 to 6, and the working examples 16, 18, and 19, relating to the fuel economy index, the steering stability, and the hydroplaning resistance performance. Table 5 lists numerical values and conditions pertaining to the dimen-

TABLE 4

| | Conventional Example | Comparative Example 1 | Comparative Example 2 | Working Example 15 | Working Example 16 | Working Example 17 | Comparative Example 3 |
|---|---|---|---|---|---|---|---|
| Nominal Width | 205 | 165 | 165 | 165 | 165 | 165 | 165 |
| Aspect Ratio | 55 | 55 | 55 | 55 | 55 | 55 | 55 |
| Inner Diameter (inches) | 16 | 20 | 20 | 20 | 20 | 20 | 20 |
| Outer Diameter (mm) | 632 | 695 | 695 | 695 | 695 | 695 | 695 |
| SW/OD | 0.32 | 0.24 | 0.24 | 0.24 | 0.24 | 0.24 | 0.24 |
| GR (%) | 30 | 30 | 8 | 15 | 20 | 25 | 30 |
| $(GRi - GRo)/GR$ | 0 | 0 | 0.4 | 0.4 | 0.4 | 0.4 | 0.4 |
| Fuel Economy Index | 100 | 100.2 | 100.2 | 100.2 | 100.2 | 100.2 | 100.2 |
| Steering Stability | 112 | 100 | 110 | 107 | 106 | 102 | 95 |
| Hydro Performance | 100 | 110 | 90 | 103 | 105 | 108 | 113 |

According to the performance testing results given in Table 4, the test tires pertaining to the working examples 15 to 17, which satisfy the relationships of Formula <1> to Formula <4>, each have an improved fuel economy index relative to the conventional example, and have improved steering stability relative to comparative example 1. That is, these test tires decrease the rolling resistance, while also enabling improvements to the steering stability that has been worsened by doing so.

Here, the pneumatic tires pertaining to comparative example 2 have an overly low groove area ratio GR (GR =8%), such that although the steering stability is good, the hydroplaning resistance performance is extremely poor. This is not preferable.

Working Examples 16, 18, 19 and Comparative Examples 4 to 6

The pneumatic tires pertaining to the working examples 16, 18, 19 and the comparative examples 4 to 6 each have a tire size of 165/55R20, a groove area ratio GR of 20%, and a value of (GRi–GRo)/GR distributed in a range of –0.4 to 0.8. As described above, the tread portion of the pneumatic tire pertaining to each of the working examples and the comparative examples is provided with a modified tread pattern based on the tread pattern illustrated in FIG. 4. Here, the pneumatic tires pertaining to the working examples 16, 18, and 19 each satisfy the relationships of Formulae <1> to <4>. Conversely, the pneumatic tires pertaining to the comparative examples 4 to 6 do not satisfy the relationship of Formula <4>. Furthermore, the pneumatic tires pertaining to the pneumatic tires of comparative examples 4 and 5 do not satisfy the relationship of Formula <3>.

sions of each of the test tires, as well as the performance testing results.

TABLE 5

| | Conventional Example | Comparative Example 1 | Comparative Example 4 | Comparative Example 5 |
|---|---|---|---|---|
| Nominal Width | 205 | 165 | 165 | 165 |
| Aspect Ratio | 55 | 55 | 55 | 55 |
| Inner Diameter (inches) | 16 | 20 | 20 | 20 |
| Outer Diameter (mm) | 632 | 695 | 695 | 695 |
| SW/OD | 0.32 | 0.24 | 0.24 | 0.24 |
| GR (%) | 30 | 30 | 20 | 20 |
| $(GRi - GRo)/GR$ | 0 | 0 | –0.4 | 0 |
| Fuel Economy Index | 100 | 100.2 | 100.2 | 100.2 |
| Steering Stability | 112 | 100 | 95 | 101 |
| Hydro Performance | 100 | 110 | 97 | 98 |

| | Working Example 18 | Working Example 16 | Working Example 19 | Comparative Example 6 |
|---|---|---|---|---|
| Nominal Width | 165 | 165 | 165 | 165 |
| Aspect Ratio | 55 | 55 | 55 | 55 |
| Inner Diameter (inches) | 20 | 20 | 20 | 20 |
| Outer Diameter (mm) | 695 | 695 | 695 | 695 |
| SW/OD | 0.24 | 0.24 | 0.24 | 0.24 |
| GR (%) | 20 | 20 | 20 | 20 |
| $(GRi - GRo)/GR$ | 0.2 | 0.4 | 0.6 | 0.8 |
| Fuel Economy Index | 100.2 | 100.2 | 100.2 | 100.2 |
| Steering Stability | 103 | 104 | 102 | 97 |
| Hydro Performance | 104 | 107 | 106 | 106 |

According to the performance testing results given in Table 5, the pneumatic tires pertaining to the working examples 16, 18, and 19, which satisfy the relationships of Formulae <1> to <4>, each have an improved fuel economy index relative to the conventional example, and have improved steering stability relative to comparative example 1. Furthermore, the pneumatic tires pertaining to the working examples 16, 18, and 19 each have a superior balance between steering stability and hydroplaning resistance performance, in comparison to the pneumatic tires pertaining to the comparative examples 4 to 6.

Working Examples 20 to 24

The pneumatic tires pertaining to the working examples 20 to 24 each have a tire size of 165/55R20 and, as described above, each have a tread portion provided with a modified tread pattern based on the tread pattern illustrated in FIG. 4. Here, the pneumatic tires pertaining to the working examples 21 to 23 satisfy the relationship of Formula <5> in addition to Formulae <1> to <4>. However, the pneumatic tires pertaining to the working examples 20 and 24 do not satisfy the relationship of Formula <5>.

Performance testing was performed on the pneumatic tires pertaining to the conventional example, comparative example 1, and the working examples 20 to 24, relating to the fuel economy index, the steering stability, and the hydroplaning resistance performance. Table 6 lists numerical values and conditions pertaining to the dimensions of each of the test tires, as well as the performance testing results.

TABLE 6

|  | Conventional Example | Comparative Example 1 | Working Example 20 | Working Example 21 |
|---|---|---|---|---|
| Nominal Width | 205 | 165 | 165 | 165 |
| Aspect Ratio | 55 | 55 | 55 | 55 |
| Inner Diameter (inches) | 16 | 20 | 20 | 20 |
| Outer Diameter (mm) | 632 | 695 | 695 | 695 |
| SW/OD | 0.32 | 0.24 | 0.24 | 0.24 |
| GR (%) | 30 | 30 | 20 | 20 |
| (GRi − GRo)/GR | 0 | 0 | 0.4 | 0.4 |
| GRLi/GRLo | 1.0 | 1.0 | 1.0 | 1.2 |
| Fuel Economy Index | 100 | 100.2 | 100.2 | 100.2 |
| Steering Stability | 112 | 100 | 101 | 104 |
| Hydro Performance | 100 | 110 | 107 | 104 |

TABLE 6-continued

|  | Working Example 22 | Working Example 23 | Working Example 24 |
|---|---|---|---|
| Nominal Width | 165 | 165 | 165 |
| Aspect Ratio | 55 | 55 | 55 |
| Inner Diameter (inches) | 20 | 20 | 20 |
| Outer Diameter (mm) | 695 | 695 | 695 |
| SW/OD | 0.24 | 0.24 | 0.24 |
| GR (%) | 20 | 20 | 20 |
| (GRi − GRo)/GR | 0.4 | 0.4 | 0.4 |
| GRLi/GRLo | 1.5 | 1.8 | 2.1 |
| Fuel Economy Index | 100.2 | 100.2 | 100.2 |
| Steering Stability | 106 | 103 | 101 |
| Hydro Performance | 105 | 103 | 101 |

According the performance testing results given in Table 6, the pneumatic tires pertaining to the working examples 21 to 23, which satisfy the relationship of Formula <5>, provide both driving stability and hydroplaning resistance performance to a high degree in comparison to comparative example 1 and the working examples 20 and 24.

Working Examples 25 to 28

The pneumatic tires pertaining to the working examples 25 to 28 each have a tire size of 165/55R20 and, as described above, each have a tread portion provided with a modified tread pattern based on the tread pattern illustrated in FIG. 4. Here, the pneumatic tires pertaining to the working examples 25 to 27 satisfy the relationship of Formula <6> in addition to Formulae <1> to <5>. However, the pneumatic tires pertaining to working example 28 do not satisfy the relationship of Formula <6>.

Performance testing was performed on the pneumatic tires pertaining to the conventional example, comparative example 1, and the working examples 25 to 28, relating to the fuel economy index, the steering stability, and the hydroplaning resistance performance. Table 7 lists numerical values and conditions pertaining to the dimensions of each of the test tires, as well as the performance testing results.

TABLE 7

|  | Conventional Example | Comparative Example 1 | Working Example 25 | Working Example 26 | Working Example 27 | Working Example 28 |
|---|---|---|---|---|---|---|
| Nominal Width | 205 | 165 | 165 | 165 | 165 | 165 |
| Aspect Ratio | 55 | 55 | 55 | 55 | 55 | 55 |
| Inner Diameter (inches) | 16 | 20 | 20 | 20 | 20 | 20 |
| Outer Diameter (mm) | 632 | 695 | 695 | 695 | 695 | 695 |
| SW/OD | 0.32 | 0.24 | 0.24 | 0.24 | 0.24 | 0.24 |
| GR (%) | 30 | 30 | 20 | 20 | 20 | 20 |
| (GRi − GRo)/GR | 0 | 0 | 0.4 | 0.4 | 0.4 | 0.4 |
| GRLi/GRLo | 1 | 1 | 1.5 | 1.5 | 1.5 | 1.5 |
| Pi/Po | 1 | 1 | 1.3 | 1.5 | 1.7 | 2.1 |
| Fuel Economy Index | 100 | 100.2 | 100.2 | 100.2 | 100.2 | 100.2 |

TABLE 7-continued

|  | Conventional Example | Comparative Example 1 | Working Example 25 | Working Example 26 | Working Example 27 | Working Example 28 |
|---|---|---|---|---|---|---|
| Steering Stability | 112 | 100 | 107 | 108 | 105 | 103 |
| Hydro Performance | 100 | 110 | 103 | 104 | 102 | 102 |

According the performance testing results given in Table 7, the pneumatic tires pertaining to the working examples 25 to 28, which satisfy the relationship of Formula <6>, provide both driving stability and hydroplaning resistance performance to a high degree in comparison to comparative example 1 and conventional example.

Working Examples 29 and 30

The pneumatic tires pertaining to the working examples 29 and 30 each have a tire size of 165/55R20 and, as described above, each have a tread portion provided with a modified tread pattern based on the tread pattern illustrated in FIG. 4. Here, the tread portion of the pneumatic tire pertaining to working example 30 is provided with the tread pattern illustrated in FIG. 3. On one hand, the pneumatic tire pertaining to working example 29 is provided with the circumferential grooves in the outer tire outside region Aoo, but is not provided with the circumferential grooves in the inner tire outside region Aoi. On the other hand, the pneumatic tire pertaining to working example 30 is provided with the circumferential grooves 12A in the inner tire outside region Aoi (see FIG. 3), but is not provided with the circumferential grooves in the outer tire outside region Aoo.

Performance testing was performed on the pneumatic tires pertaining to the conventional example, comparative example 1, and the working examples 29 and 30, relating to the fuel economy index, the steering stability, and the hydroplaning resistance performance. Table 8 lists numerical values and conditions pertaining to the dimensions of each of the test tires, as well as the performance testing results. Here, the items listed under Outside Circumferential Groove Position in Table 8 indicate the provision of the circumferential grooves 12, reading Aoi for the inner tire outside region Aoi, reading Aoo for the outer tire outside region Aoo, and reading Aoi, Aoo for both the inner tire outside region Aoi and the outer tire outside region Aoo.

TABLE 8

|  | Conventional Example | Comparative Example 1 | Working Example 29 | Working Example 30 |
|---|---|---|---|---|
| Nominal Width | 205 | 165 | 165 | 165 |
| Aspect Ratio | 55 | 55 | 55 | 55 |
| Inner Diameter (inches) | 16 | 20 | 20 | 20 |
| Outer Diameter (mm) | 632 | 695 | 695 | 695 |
| SW/OD | 0.32 | 0.24 | 0.24 | 0.24 |
| GR (%) | 30 | 30 | 20 | 20 |
| (GRi − GRo)/GR | 0 | 0 | 0.4 | 0.4 |
| GRLi/GRLo | 1 | 1 | 1.5 | 1.5 |
| Pi/Po | 1 | 1 | 1.5 | 1.5 |
| Outside Circumferential Groove Position | Aoi, Aoo | Aoi, Aoo | Aoo | Aoi |
| GRBi/GRBo | 1 | 1 | 1.5 | 1.5 |
| Fuel Economy Index | 100 | 100.2 | 100.2 | 100.2 |
| Steering Stability | 112 | 100 | 105 | 109 |
| Hydro Performance | 100 | 110 | 100 | 104 |

According to the performance testing described in Table 8, the pneumatic tires pertaining to working example 30, where the circumferential grooves are provided in the inner tire outside region Aoi, have greater steering stability and hydroplaning resistance performance in comparison to the pneumatic tires pertaining to working example 29, where the circumferential grooves are not provided in the inner tire outside region Aoi.

Working Examples 30 to 34

The pneumatic tires pertaining to the working examples 30 to 34 are test tires each having a tire size of 165/55R20, and have the circumferential grooves 12 provided in the inner tire outside region Aoi while the circumferential grooves 12 are not provided in the outer tire outside region Aoo, and further have a value of GRBi/GRBo that is distributed in a range of 0.9 to 2.1. As described above, the tread portion of the pneumatic tire pertaining to each of the working examples is provided with a modified tread pattern based on that of FIG. 4. Here, the pneumatic tires pertaining to the working examples 30, 32, and 33 each satisfy the relationship of Formula <7>. However, the pneumatic tires pertaining to the working examples 31 and 34 do not satisfy the relationship of Formula <7>.

Performance testing was performed on the pneumatic tires pertaining to the conventional example, comparative example 1, and the working examples 30 to 34, relating to the fuel economy index, the steering stability, and the hydroplaning resistance performance. Table 9 lists numerical values and conditions pertaining to the dimensions of each of the test tires, as well as the performance testing results.

TABLE 9

|  | Conventional Example | Comparative Example 1 | Working Example 31 | Working Example 32 | Working Example 30 | Working Example 33 | Working Example 34 |
|---|---|---|---|---|---|---|---|
| Nominal Width | 205 | 165 | 165 | 165 | 165 | 165 | 165 |
| Aspect Ratio | 55 | 55 | 55 | 55 | 55 | 55 | 55 |
| Inner Diameter (inches) | 16 | 20 | 20 | 20 | 20 | 20 | 20 |
| Outer Diameter (mm) | 632 | 695 | 695 | 695 | 695 | 695 | 695 |
| SW/OD | 0.32 | 0.24 | 0.24 | 0.24 | 0.24 | 0.24 | 0.24 |
| GR (%) | 30 | 30 | 20 | 20 | 20 | 20 | 20 |
| (GRi − GRo)/GR | 0 | 0 | 0.4 | 0.4 | 0.4 | 0.4 | 0.4 |
| GRLi/GRLo | 1 | 1 | 1.5 | 1.5 | 1.5 | 1.5 | 1.5 |
| Pi/Po | 1 | 1 | 1.5 | 1.5 | 1.5 | 1.5 | 1.5 |
| Outside Circumferential Groove Position | Aoi, Aoo | Aoi, Aoo | Aoi | Aoi | Aoi | Aoi | Aoi |
| GRBi/GRBo | 1 | 1 | 0.9 | 1.2 | 1.5 | 1.8 | 2.1 |
| Fuel Economy Index | 100 | 100.2 | 100.2 | 100.2 | 100.2 | 100.2 | 100.2 |
| Steering Stability | 112 | 100 | 104 | 107 | 109 | 107 | 105 |
| Hydro Performance | 100 | 110 | 103 | 102 | 104 | 103 | 101 |

According to the performance results given in Table 9, the pneumatic tires pertaining to the working examples 30, 32, and 33, which satisfy the relationship of Formula <7>, provide improved hydroplaning resistance performance in comparison to comparative example 1 and the working examples 31 and 34.

Here, the present technology has been described in detail in terms of the specified embodiments. However, various modifications, corrections, and the like that do not exceed the intent and scope of the claims of the present technology will be apparent to those skilled in the art.

The present technology is specified as follows.

(1) A pneumatic tire having an asymmetrical pattern formed by grooves on a tread portion, the ratio of a total width SW and an outer diameter OD of the pneumatic tire SW/OD satisfying:

$SW/OD \leq 0.3$ and when a groove area ratio of a ground contact region of the tread portion is GR, and while mounted on a vehicle, when a range of the ground contact region positioned on a vehicle side relative to a tire equatorial line is a tire inside region Ai and a groove area ratio in the tire inside region Ai is GRi, and while mounted on the vehicle, when a range of the ground contact region positioned on a side opposite to the vehicle side relative to the tire equatorial line is a tire outside region Ao and a groove area ratio in the tire outside region Ao is GRo, the ground contact region being formed to satisfy:

$10\% \leq GR \leq 25\%$;

$GRo < GRi$; and $0.1 \leq (GRi - GRo)/GR \leq 0.6$.

(2) The pneumatic tire described in point (1), wherein a plurality of lateral grooves extending in a direction transversing a tire circumferential direction is provided in the tread portion, and when a groove area ratio of the lateral grooves in the ground contact region is GRL, a groove area ratio of the lateral grooves in the tire outside region Ao is GRLo, and a groove area ratio of the lateral grooves in the tire inside region Ai is GRLi, $1.1 \leq GRLi/GRLo \leq 1.9$ is satisfied.

(3) The pneumatic tire described in point (2), wherein the lateral grooves are arranged with spacing in the tire circumferential direction, and in an entire circumference of the tread portion of the pneumatic tire, when a number of the lateral grooves arranged in the tire inside region Ai is Pi, and a number of the lateral grooves arranged in the tire outside region Ao is Po, $1 < Pi/Po \leq 2$ is satisfied.

(4) The pneumatic tire described in any one of points (1) to (3), wherein when a range positioned on a tire equatorial line side of the tire outside region Ao and having a width of 25% of a ground contact width is an inner tire outside region Aoi, and a range of the tire outside region Ao excluding the inner tire outside region Aoi is an outer tire outside region Aoo, a circumferential groove extending in the tire circumferential direction is provided in the inner tire outside region Aoi and is not provided in the outer tire outside region Aoo.

(5) The pneumatic tire described in any one of points (1) to (4), wherein an inside circumferential groove is provided as the circumferential groove extending in the tire circumferential direction in the tire inside region Ai, and an outside circumferential groove is provided as the circumferential groove extending in the tire circumferential direction in the tire outside region Ao, and when a groove area ratio of the inside circumferential groove in the tire inside region Ai is GRBi, and a groove area ratio of the outside circumferential groove in the tire outside region Ao is GRBo, $$1 \leq GRBi/GRBo \leq 2$$

is satisfied.

The invention claimed is:
1. A pneumatic tire having an asymmetrical pattern formed by grooves on a tread portion,
the ratio of a total width SW and an outer diameter OD of the pneumatic tire SW/OD satisfying:

$$SW/OD < 0.3,$$

and
when a groove area ratio of a ground contact region of the tread portion is GR, and
while mounted on a vehicle, when a range of the ground contact region positioned on a vehicle side relative to a tire equatorial line is a tire inside region Ai and a groove area ratio in the tire inside region Ai is GRi, and while mounted on the vehicle, when a range of the ground contact region positioned on a side opposite to the vehicle side relative to the tire equatorial line is a tire outside region Ao and a groove area ratio in the tire outside region Ao is GRo, the ground contact region being formed to satisfy:

$$10\% \leq GR \leq 25\%;$$

$$GRo < GRi; \text{ and}$$

$$0.1 \leq (GRi - Gro)/GR \leq 0.6 \text{ ; wherein}$$

the grooves comprise a plurality of lateral grooves and two circumferential main grooves in the tire inside region Ai and a plurality of lateral grooves and only one circumferential main groove in the tire outside region Ao, the plurality of lateral grooves in the tire outside region Ao having a greater width than the plurality of lateral grooves in the tire inside region Ai, a number of the lateral grooves in the tire inside region Ai is greater than a number of the lateral grooves in the tire outside region Ao, and the circumferential main groove in the tire outside region Ao having a greater width than the circumferential main grooves in the tire inside region Ai;
one circumferential rib of a plurality of circumferential ribs formed by the one circumferential main groove in the tire outside region Ao and one of the two circumferential main grooves in the tire inside region Ai is continuous in the circumferential direction and off center from the tire equatorial line, the plurality of circumferential ribs including a shoulder rib on an outer side in the tire width direction of the one circumferential main groove in the tire outside region Ao, wherein all of the lateral grooves in the shoulder rib and the one circumferential rib in the tire outside region Ao are one-end opening lateral grooves; and
a block row is formed by the two circumferential main grooves in the tire inside region Ai with blocks divided by straight grooves that are inclined with respect to a tire width direction.
2. The pneumatic tire according to claim 1, wherein
the plurality of lateral grooves in the tire inside region Ai and the tire outside region Ao extending in a direction transversing a tire circumferential direction is provided in the tread portion, and
when a groove area ratio of the lateral grooves in the ground contact region is GRL, a groove area ratio of the lateral grooves in the tire outside region Ao is GRLo, and a groove area ratio of the lateral grooves in the tire inside region Ai is GRLi, 1. $1 \leq GRLi/GRLo \leq 1.9$ is satisfied.
3. The pneumatic tire according to claim 2, wherein
the lateral grooves are arranged with spacing in the tire circumferential direction, and
in an entire circumference of the tread portion of the pneumatic tire, when a number of the lateral grooves arranged in the tire inside region Ai is Pi, and a number of the lateral grooves arranged in the tire outside region Ao is Po, $$1 < Pi/Po \leq 2$$

is satisfied.
4. The pneumatic tire according to claim 3, wherein
when a range positioned on a tire equatorial line side of the tire outside region Ao and having a width of 25% of a ground contact width is an inner tire outside region Aoi, and a range of the tire outside region Ao excluding the inner tire outside region Aoi is an outer tire outside region Aoo, a circumferential groove extending in the tire circumferential direction is provided in the inner tire outside region Aoi and is not provided in the outer tire outside region Aoo.
5. The pneumatic tire according to claim 4, wherein
when a groove area ratio of the two circumferential main grooves in the tire inside region Ai is GRBi, and a groove area ratio of the one circumferential main groove in the tire outside region Ao is GRBo, $$1 \leq GRBi/GRBo \leq 2$$

is satisfied.
6. The pneumatic tire according to claim 3, wherein
when a groove area ratio of the two circumferential main grooves in the tire inside region Ai is GRBi, and a groove area ratio of the one circumferential main groove in the tire outside region Ao is GRBo, $$1 \leq GRBi/GRBo \leq 2$$

is satisfied.
7. The pneumatic tire according to claim 2, wherein
when a range positioned on a tire equatorial line side of the tire outside region Ao and having a width of 25% of a ground contact width is an inner tire outside region Aoi, and a range of the tire outside region Ao excluding the inner tire outside region Aoi is an outer tire outside region Aoo, a circumferential groove extending in the tire circumferential direction is provided in the inner tire outside region Aoi and is not provided in the outer tire outside region Aoo.
8. The pneumatic tire according to claim 7, wherein
when a groove area ratio of the two circumferential main grooves in the tire inside region Ai is GRBi, and a groove area ratio of the one circumferential main groove in the tire outside region Ao is GRBo, $$1 \leq GRBi/GRBo \leq 2$$

is satisfied.
9. The pneumatic tire according to claim 2, wherein
when a groove area ratio of the two circumferential main grooves in the tire inside region Ai is GRBi, and a groove area ratio of the one circumferential main groove in the tire outside region Ao is GRBo, $1 \leq GRBi/GRBo \leq 2$ is satisfied.

10. The pneumatic tire according to claim 1, wherein when a range positioned on a tire equatorial line side of the tire outside region Ao and having a width of 25% of a ground contact width is an inner tire outside region Aoi, and a range of the tire outside region Ao excluding the inner tire outside region Aoi is an outer tire outside region Aoo, a circumferential groove extending in the tire circumferential direction is provided in the inner tire outside region Aoi and is not provided in the outer tire outside region Aoo.

11. The pneumatic tire according to claim 10, wherein when a groove area ratio of the two circumferential main grooves in the tire inside region Ai is GRBi, and a groove area ratio of the one circumferential main groove in the tire outside region Ao is GRBo, $1 \leq GRBi/GRBo \leq 2$ is satisfied.

12. The pneumatic tire according to claim 1, wherein when a groove area ratio of the two circumferential main grooves in the tire inside region Ai is GRBi, and a groove area ratio of the one circumferential main groove in the tire outside region Ao is GRBo, $1 \leq GRBi/GRBo \leq 2$ is satisfied.

\* \* \* \* \*